United States Patent
Mittendorf et al.

[11] Patent Number: 5,874,015
[45] Date of Patent: Feb. 23, 1999

[54] METHOD FOR MAKING A RHENIUM ROCKET NOZZLE

[75] Inventors: Donald Lee Mittendorf, Mesa; Trevor G. Sutton, Tempe, both of Ariz.

[73] Assignee: AlliedSignal Inc., Morris Township, N.J.

[21] Appl. No.: 659,792

[22] Filed: Jun. 6, 1996

[51] Int. Cl.$^6$ ............................ B23P 15/00; B44C 1/22
[52] U.S. Cl. ...................... 216/100; 29/890.01; 428/628
[58] Field of Search .................. 216/100; 29/890.01; 428/628

[56] References Cited

U.S. PATENT DOCUMENTS

| | | | |
|---|---|---|---|
| 4,917,968 | 4/1990 | Tuffias et al. | 428/621 |
| 5,473,817 | 12/1995 | Schnoor et al. | 29/890.01 |
| 5,613,299 | 3/1997 | Ring et al. | 29/890.01 |

Primary Examiner—R. Bruce Breneman
Assistant Examiner—Michael E. Adjodha
Attorney, Agent, or Firm—Jerry J. Holden

[57] ABSTRACT

A method for making an article from rhenium and in particular a rocket nozzle. First a molybdenum mandrel is formed with a portion having the desired shape of the nozzle. A layer of rhenium is deposited over the nozzle portion, and then rhenium wire is wrapped around this rhenium layer. A second rhenium layer or a layer of ruthenium is then deposited over the layer of rhenium wire. Alternating layers of rhenium wire and deposited rhenium or ruthenium are applied until a desired thickness is obtained. A layer of molybdenum is applied to can the assembly and the assembly is subject to hot isostatic pressing. Finally, the molybdenum is etched away leaving the rhenium nozzle.

10 Claims, 1 Drawing Sheet

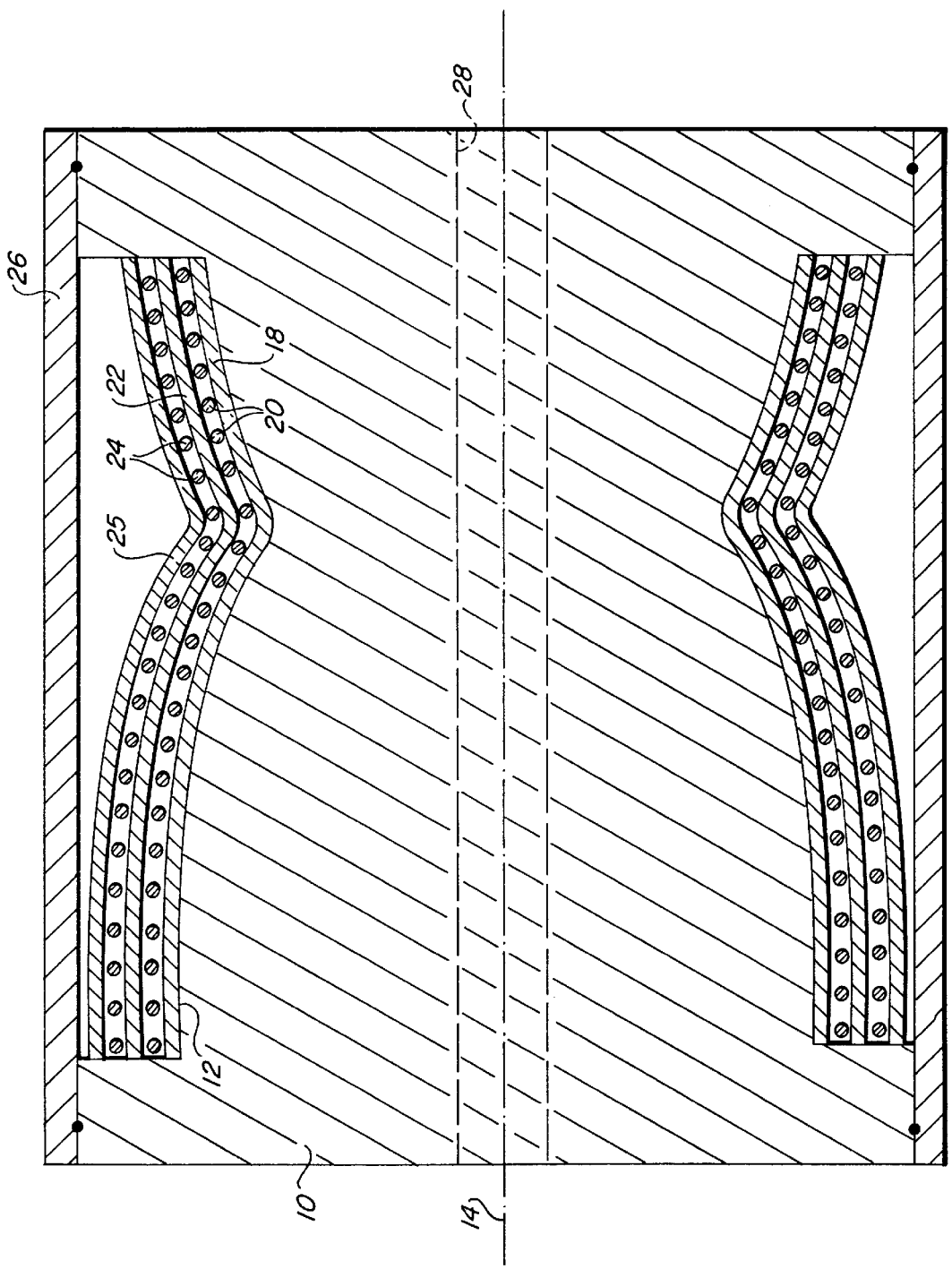

METHOD FOR MAKING A RHENIUM ROCKET NOZZLE

TECHNICAL FIELD

This invention relates generally to rocket nozzles, and in particular to a method of making rocket nozzles from rhenium.

BACKGROUND OF THE INVENTION

Currently, mono-propellant and bi-propellant radiation cooled rockets use nozzles and thrust chambers made of a columbium alloy, ($Cb_{103}$), covered with a fused silica coating for oxidation protection. These columbium nozzles and thrust chambers can withstand temperatures as high as 2400° F. A need has developed in the rocket propulsion industry for structures, such as nozzles, that can withstand even higher temperatures. Because of its mechanical integrity and toughness at high temperatures, rhenium is an ideal metal for such structures. However, rhenium has a very high melting point and a very high strain hardening coefficient. As a result, conventional processes for manufacturing rhenium articles such as powder metallizing and chemical vapor deposition are both expensive and difficult to control.

Accordingly there is a need for a new and improved method of manufacturing thick film, net shape articles from rhenium.

SUMMARY OF THE INVENTION

An object of the present invention is to provide a method for manufacturing thick film, net shape rhenium structures.

The present invention achieves this object by providing a method for making an article, particularly a rocket nozzle. First, a molybdenum mandrel is formed with a portion having the desired shape of the nozzle. A layer of rhenium is deposited over the nozzle portion, and then rhenium wire is wrapped around this deposited rhenium layer. A second rhenium layer or a layer of ruthenium is then deposited over the layer of rhenium wire. Alternating layers of rhenium wire and deposited rhenium or ruthenium are applied until a desired thickness is obtained. A layer of molybdenum is applied to can the assembly and the assembly is subject to hot isostatic pressing. Finally, the molybdenum is etched away leaving the rhenium nozzle.

BRIEF DESCRIPTION OF THE DRAWING

The sole FIGURE is a cross-sectional schematic of a rhenium nozzle mandrel formed during the method contemplated by the present invention.

DESCRIPTION OF THE PREFERRED EMBODIMENT

Referring to the drawing, a mandrel 10 is formed in a manner familiar to those skilled in the art to have a nozzle portion 12 with the desired shape. The mandrel is preferably made of a molybdenum such as TZM, though other conventional materials may be used. The molybdenum-mandrel 10 is symmetric about an axially extending centerline 14.

A uniform layer 18 of substantially pure rhenium is deposited on the outer surface of the nozzle portion 12. The deposition is accomplished by chemical vapor deposition (CVD), using chloride or fluoride precursors. The thickness of the layer 18 should be in the range of 0.003 to 0.030 inch. Next, a layer of rhenium wire 20 is wrapped around the layer 18. In performing this step it is important to avoid contamination of the layer 18. The wire 20 should be wrapped as tight as possible and is attached at both ends to the molybdenum mandrel 10. The attachment mechanism can be a tack weld or a locking slot arrangement. Another uniform layer 22 of substantially pure rhenium is deposited over the layer 20 followed by second of layer of rhenium wire 24. The alternating layers of CVD deposited rhenium and rhenium wire are repeated until a desired thickness is achieved, preferably 0.030 to 0.125 inch. The last layer applied must be a CVD layer because this layer will activate diffusion during subsequent thermal processing.

Alternatively, the layer 22 of CVD and the other CVD layers can be replaced with layers of electroplated ruthenium which will also activate diffusion during thermal processing.

The final layer of either CVD rhenium or electroplated ruthenium is then canned with a layer 26 of molybdenum which is electron beam welded to the mandrel 10 to seal the rhenium from the atmosphere. The purpose of the can is to provide a sealed container for the high pressure gas in a HIP furnace to push on, thereby putting the rhenium composite structure in three dimensional compression to deform out the voids in the structure. The canned assembly is subjected to hot isostatic pressing (HIP), to increase density to 100 percent and metallurgically fuse mechanical surfaces. Mechanical surfaces are wire-to-wire surfaces or CVD deposit-to-wire surfaces. The HIP process allows for mechanical deformation of metallic surfaces in locations that are voided and allows for mutual contact thereby increasing the density. With all mechanical surfaces in contact the activator (CVD rhenium or deposited ruthenium) drives diffusion in the presence of the high temperature obtained during the HIP process. Diffusion across mechanical surfaces results in metallurgical bonding making the entire structure homogenous.

The nozzle portion 12 is now removed from the mandrel 10 by chemically etching the molybdenum away. This etching is accomplished by exposing the molybdenum to an acid, such as aqua regia, which dissolves the molybdenum and only slightly etches the remaining rhenium nozzle. A hole 28 is drilled through the center of the mandrel 10 to facilitate its removal. The result is a net shape, thick film rhenium nozzle. If desired, a ceramic and oxidation barrier coating can be applied to the nozzle portion prior to the first CVD layer of rhenium and after the last CVD layer of rhenium.

Though the foregoing description of the subject invention has been in context of a rocket nozzle, it will be apparent to those skilled in the art that the subject invention is equally applicable to other types of articles. Various modifications and alterations to the above described preferred embodiment will be also apparent to those skilled in the art. Accordingly, this description of the invention should be considered exemplary and not as limiting the scope and spirit of the invention as set forth in the following claims.

What is claimed is:

1. A method for forming a rhenium article, comprising the following steps:
   (a) providing a mandrel having a portion with the desired shape of said article;
   (b) depositing a first layer of rhenium over said portion;
   (c) wrapping rhenium wire around said first layer;
   (d) depositing over said rhenium wire a second layer of a material that will activate diffusion during step (f);
   (e) canning the mandrel;
   (f) hot isostatic pressing the assembly of step (e); and (g) etching the mandrel away.

2. The method of claim 1 further including between steps (d) and (e) the step of repeating steps (c) and (d) sequentially until a desired thickness is reached.

3. The method of claim 1 wherein said depositing in step (b) is chemical vapor deposition.

4. The method of claim 3 wherein said depositing in step (d) is chemical vapor deposition and said material is rhenium.

5. The method of claim 3 wherein said depositing in step (d) is electroplating and said material is ruthenium.

6. The method of claim 1 further comprising between step (a) and (b) the step of applying an oxidation barrier coating over said portion.

7. The method of claim 1 wherein said mandrel is a molybdenum.

8. A rhenium article made in accordance with the method of claim 1.

9. The method of claim 1 wherein in step (g) an acid is used.

10. The method of claim 9 wherein said acid is aqua regia.

* * * * *